Sept. 29, 1959    T. S. GATES ET AL    2,906,177
GEAR FINISHING
Filed Oct. 8, 1956    6 Sheets-Sheet 1

INVENTORS
THOMAS S. GATES
ROBERT M. WILLIAMS
BY
ATTORNEYS

Sept. 29, 1959     T. S. GATES ET AL     2,906,177
GEAR FINISHING

INVENTORS
THOMAS S. GATES
ROBERT M. WILLIAMS
BY Whittemore, Hulbert
& Belknap
ATTORNEYS

United States Patent Office 2,906,177
Patented Sept. 29, 1959

2,906,177

GEAR FINISHING

Thomas S. Gates, Grosse Pointe Woods, and Robert M. Williams, East Detroit, Mich., assignors to National Broach & Machine Company, Detroit, Mich., a corporation of Michigan Application October 8, 1956, Serial No. 614,611

12 Claims. (Cl. 90—1)

The present invention relates to gear finishing and more particularly to a machine including means for effecting automatic loading and unloading of work gears on the machine.

It is an object of the present invention to provide a machine for finishing internal gears including mechanism for advancing a work gear from a supply of unfinished gears to the machine and for removing finished gears from the machine and advancing them to a receiver therefor.

More specifically, it is an object of the present invention to provide a fully automatic machine for finishing internal gears characterized by the rapidity with which unfinished gears are supplied to the machine and finished gears are removed therefrom.

It is a further object of the present invention to provide a machine for finishing internal gears operable automatically to advance unfinished work gears to the machine, to position the unfinished work gears on a gear-like finishing tool, to advance the meshed work gears and gear-like finishing tool to a work support, and adapted to grip the unfinished gears.

It is a further object of the present invention to provide a novel method for supplying a series of gears from a supply of unfinished gears to a gear finishing machine, for loading the unfinished gears on the gear finishing machine, for removing finished gears from the machine, and for depositing finished gears in a receiver therefor.

It is a further object of the present invention to provide a method of supplying a series of gears from a supply of unfinished gears to a gear finishing machine having a work support and a support for a gear-like tool which are separated in loading position, and removing finished gears from the machine and depositing them in a receiver which is spaced from the supply of unfinished gears, the method comprising positioning a carrier having a finished gear therein intermediate the supply of unfinished gears and the receiver, pushing an unfinished gear from the supply into the carrier to thereby push the finished gear into the receiver, moving the carrier to a position intermediate the work support and the tool support, pushing a finished gear from the gear support onto the carrier, and with the finished gear, pushing the unfinished gear onto and in meshed engagement with a gear-like tool on the tool support, returning the carrier to position between the supply of unfinished gears and the receiver, relatively moving the gear support and tool support to cause the unfinished gear supported in meshed relation on the tool to move into engagement with the work support, machining the gear with the tool on the tool support, and finally separating the work support and tool support while leaving the finished work gear supported by the work support.

Other objects and features of the invention will become apparent as the description proceeds, especially when taken in conjunction with the acompanying drawings, wherein:

The present invention relates to the finishing of internal gears by a crossed axes gear finishing operation which may be gear shaving, gear tooth honing, or the like. Described in general terms, the operation comprises rotating the internal gear in mesh with an externally toothed gear-like finishing tool. The teeth of the tool may be provided with cutting edges so as to shave the teeth of the gear. Alternatively, the teeth of the tool may be formed of a suitable hard but resilient plastic material having abrasive particles embedded therein, in which case the operation may be gear tooth honing.

In either case, the gear finishing operation may be accomplished by effecting a radial feed between the gear and tool to perform an operation known as "plunge finishing." Alternatively, relative traverse may be provided between the tool and gear in a direction parallel or substantially parallel to the axis of the gear, preferably accompanied by intermittent radial feed.

One of the difficulties in providing an internal gear finishing operation in an automated line, or for providing for fully automatic loading and unloading of the gear finishing machine, is to provide for movement of a gear into properly meshed relation with the tool, or vice-versa. In the present invention this is accomplished in a unique manner by providing for a loading condition in the machine tool in which the work gear support or chuck and the gear-like tool are separated, with the gear-like tool located in front of the open end of the chuck. Spaced laterally and preferably above the work and tool support is a supply of unfinished gears, preferably located in a feed chute, and laterally separated therefrom, a receiver for finished gears preferably in the form of a discharge chute.

A gear carrier is provided movable from a transfer position in which it is located between the gear supply and receiver to a loading position in which it is located between the work support and the tool support. Means are provided in association with the supply of unfinished gears for pushing an unfinished gear from the supply onto the carrier or transfer device while it is in transfer position. Movement of the unfinished gear onto the carrier pushes a previously finished gear therefrom to the receiver. Thereafter, the carrier with the unfinished gear thereon, moves to its loading position between the work and the tool support. At this time, means push the previously finished gear from the work support onto the carrier, and movement of the finished gear onto the carrier pushes the unfinished gear onto and in meshed engagement with the gear-like cutter carried by the tool support. Thereafter, the carrier with the finished gear thereon, returns to transfer position where the finished gear is deposited in the receiver and a new unfinished gear is supplied thereto. Meanwhile, relative approach between the work support and the tool support causes the tool, with the internal gear supported in meshed relation thereon, to approach the work support which is operable to grip and engage the work gear in operating relation. Thereafter, machining of the teeth of the work gear is accomplished, after which separation takes place leaving the finished gear supported by the work support. The foregoing cycle is repeated continuously.

Figure 1:
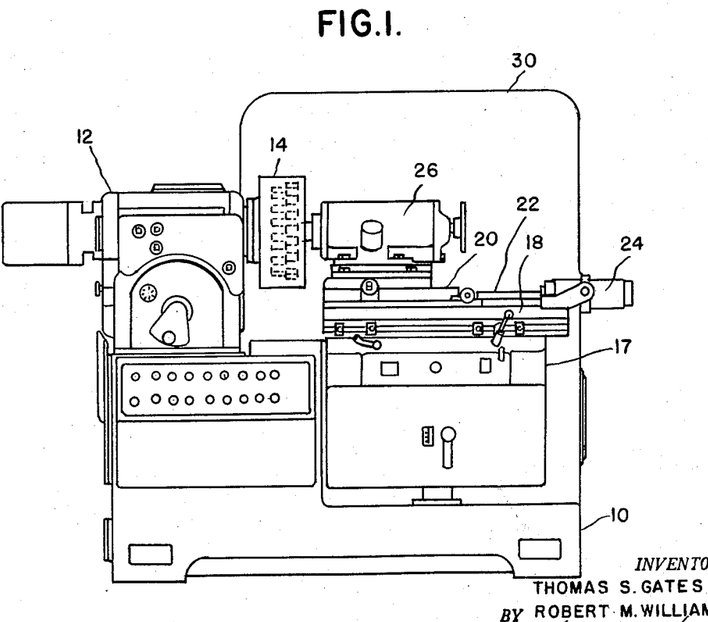
Figure 1 is a front elevation of an internal gear finishing machine with the automatic loading component omitted.
Figure 2:
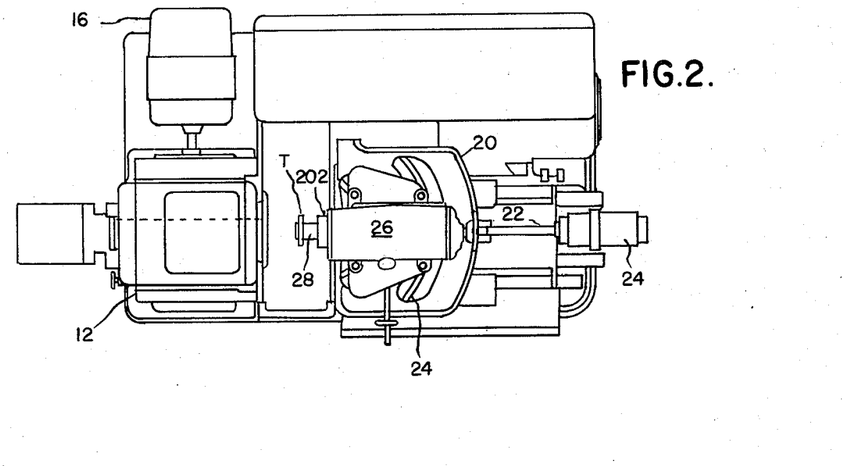
Figure 2 is a plan view of the machine shown in Figure 1.
Figures 3, 5, 6:
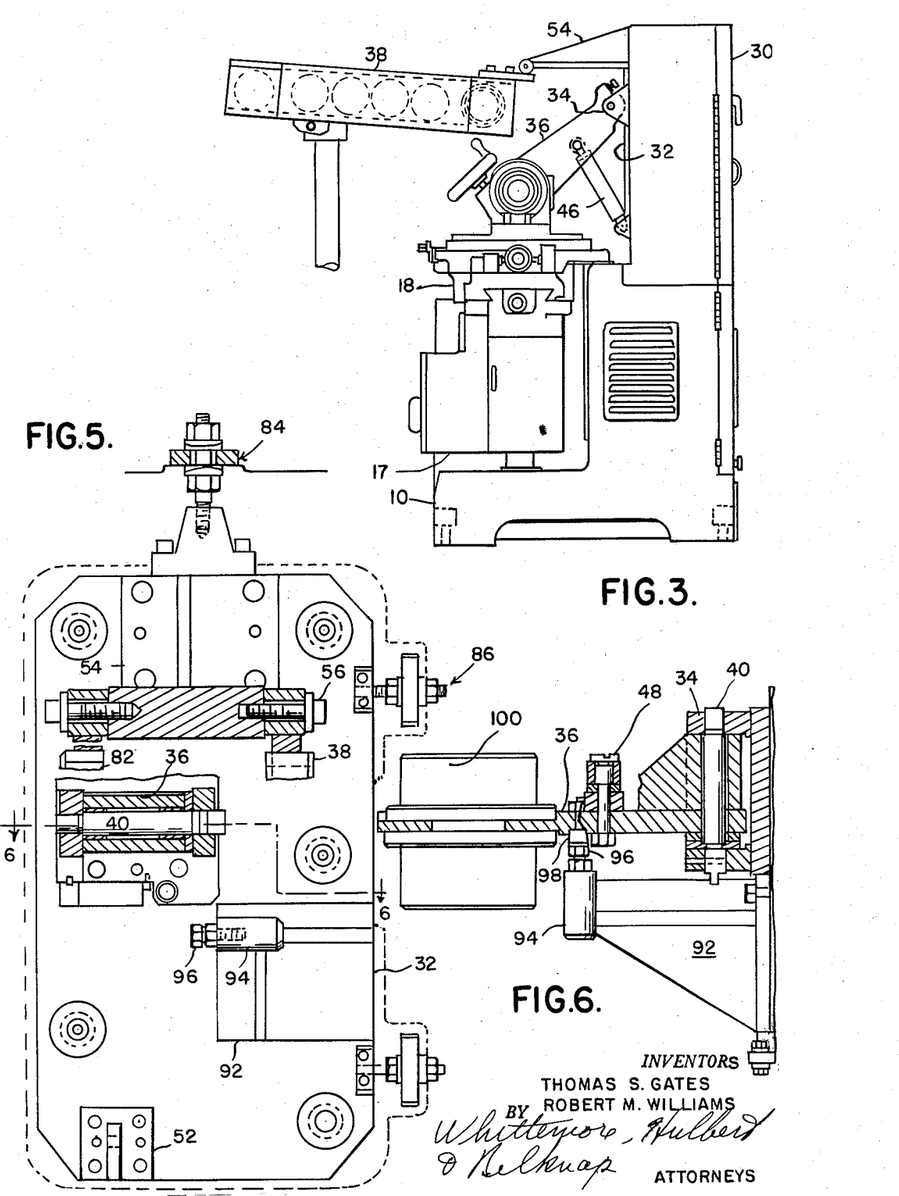
Figure 3 is a side elevation of the machine shown in Figures 1 and 2, with the automatic loading and unloading components included.
Figure 5 is a fragmentary front elevation partly in section, of the mounting structure for the automatic loading and unloading components.
Figure 6 is a fragmentary section on the line 6—6, Figure 5, in which some of the structure omitted from Figure 5 is included.

Referring now to Figures 1–3, the gear finishing machine which is employed in the present invention, comprises a base 10 having a work support column 12 at one end provided with a chuck 14 for receiving and clampingly engaging a work gear. A motor 16 is provided for effecting rotation of the chuck so as to drive the internal gear carried thereby in meshed relation with a gear finishing tool. Mounted on the base or frame 10 is a vertically adjustable knee 17, and a movable tool table 18 is provided on the knee in rectilinear ways for movement toward and away from the work column 12. A tool slide 20 is mounted on the table 18 for movement toward and away from the work column 12 and is connected by a link 22 to an air cylinder or the like 24 for effecting a substantial and relatively quick movement of the tool or cutter slide 20. The slide 20, as best seen in Figure 1, is provided with arcuate ways 24, and a tool supporting head 26 is supported thereon for angular adjustment about the center of the ways 24. The tool supporting head 26 includes a freely rotatable arbor 28 adaptable to support a gear-like tool T at one end thereof. The center of the arcuate ways is located substantially beneath the tool T. Angular adjustment of the head 26 provides the crossed axes relationship between the gear and the tool which has previously been referred to.

Referring now more particularly to Figure 3, the frame 10 includes at the back thereof and extending for the major portion of the width of the machine, a supporting panel 30. A mounting plate 32 is secured to the panel and pivoted to ears 34 on the mounting plate is a transfer device 36 movable between the loading position illustrated in Figure 3 and a transfer position in which its movable end is in alignment with the gear located at the end of a supply chute 38.

Figure 4:
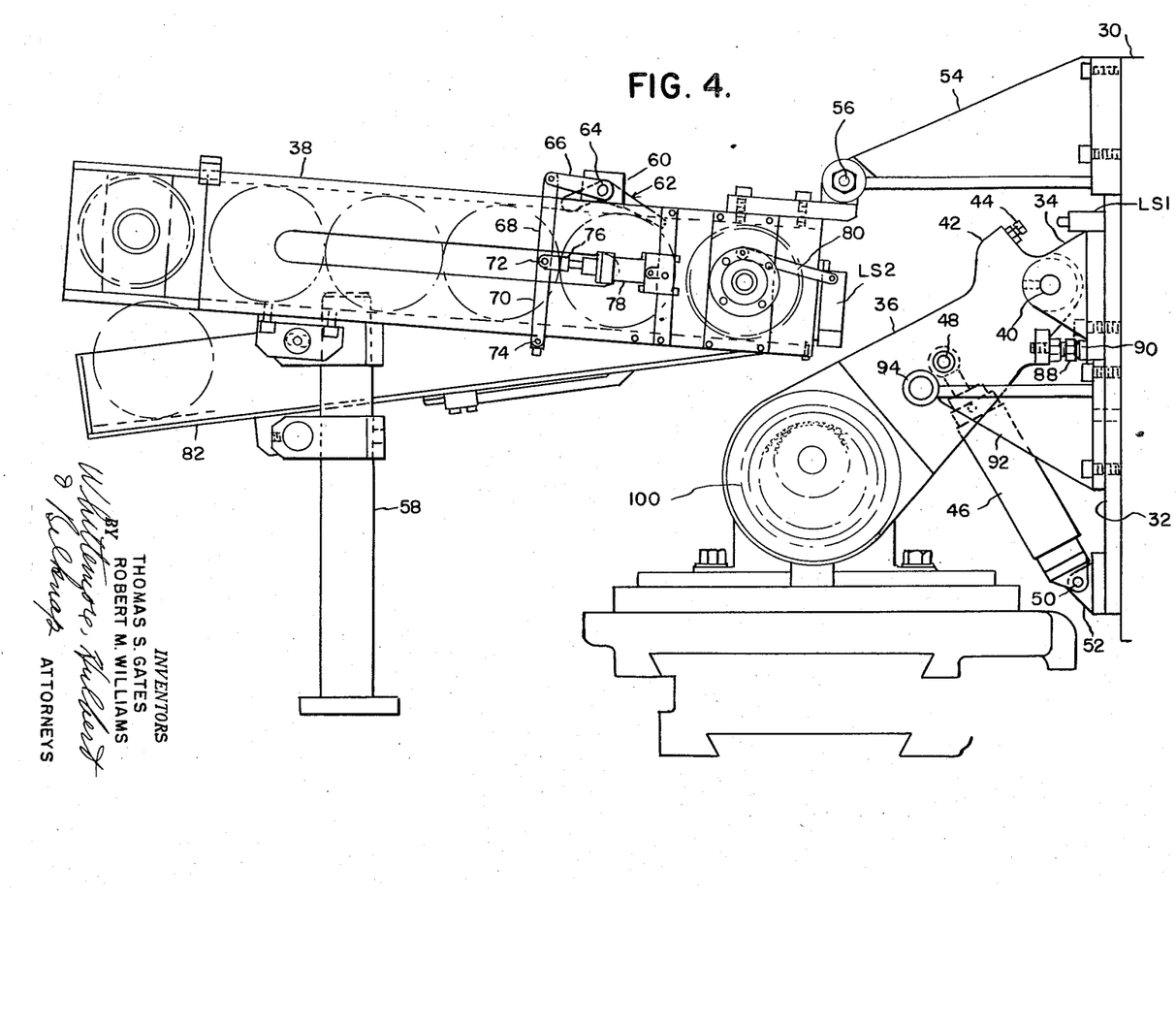
Figure 4 is an enlarged fragmentary side elevation of the automatic loading and unloading components of the machine.

Referring now more particularly to Figures 4–6, the transfer device 36 comprises an arm pivoted to the ears 34 by a pivot pin 40. The arm includes a lateral extension 42 having an adjustable abutment 44 thereon engageable with a limit switch LS1. A fluid actuated piston and cylinder device 46 is provided which is pivoted as indicated at 48 to the arm 36 and which is pivoted as indicated at 50 to ears 52 carried by the mounting plate 32.

A bracket 54 is secured to the panel 30 adjacent its top and at its forward end is provided with a pivot connection 56 to the lower end of the supply chute 38. The supply chute is retained in the proper inclined position to effect gravity feed of gears by a pedestal 58.

Pivoted to a mounting block 60 carried on the supply chute 38 is a metering bellcrank lever 62. The lever is mounted on a shaft 64 having an operating arm 66 connected to one link 68 of a toggle mechanism which includes a second link 70 pivoted to the first link as indicated at 72, and having its other end pivotally supported as indicated at 74. Connected to the pivot connection 72 is a clevis 76 which is connected to the piston of an air cylinder 78. With the parts in the position illustrated in Figure 4, it will be observed that the arm of the bellcrank lever 62 to the right is retaining a gear from advancing in the supply chute. When air is admitted to the cylinder 78, the toggle is collapsed, the aforesaid gear is released, and the left hand arm of the bellcrank is moved into position to prevent advance of the next following gear. When the air cylinder is actuated in its succeeding stroke, to straighten the toggle, the next succeeding gear is released to move into engagement with the right hand arm of the bellcrank. The limit switch LS2 is provided adjacent the discharge end of the supply chute having an actuating arm 80 adapted to actuate the limit switch when a gear is pushed therefrom onto the transfer device, as will subsequently be described.

Associated with the supply chute 38 is the receiver or discharge chute 82 also supported in part by the pedestal 58 and connected to the bracket 54. The upper or finished gear receiving end of the discharge chute is in alignment with but laterally spaced from the lower or discharge end of the supply chute 38. It will be appreciated that the transfer device moves from the position illustrated in Figure 4 to a transfer position in which the gear receiving portion thereof is interposed between the adjacent ends of the chutes.

Means are provided for effecting accurate location of the mounting plate 32 comprising the adjustable support devices indicated generally at 84 and 86.

The arm of the transfer device 36 is provided with an abutment screw 88 engageable with an abutment stud 90 to assist in locating the position of the transfer device 36.

Also, to assist in locating the transfer device 36 in loading position there is provided a bracket 92 having a tapped enlargement 94 at the outer end thereof receiving an adjustable bolt 96. Carried by an intermediate portion of the arm of the transfer device 36 is an abutment stud 98 engageable with the head of the bolt 96 to locate the arm of the transfer device in a vertical plane.

Referring now more particularly to Figures 7–10 there is illustrated in detail the construction of the carrier portion 100 of the transfer device. Before referring to the drawings it may be well to explain that in general the carrier constitutes a cylindrical body open at both ends and adapted to receive a work gear into either end thereof. Intermediate the open ends of the generally cylindrical carrier 100 is a pusher 101 movable axially of the carrier and operable to eject or discharge a gear at one end of the carrier when a gear is inserted into the opposite end thereof. In general, the operation consists of inserting an unfinished gear into the end of the carrier which will be remote from the gear chuck and adjacent the cutter when the carrier is moved to loading position between these members. If it is assumed that a finished gear is in the chuck at this, movement of the gear out of the chuck into the adjacent end of the carrier will operate the pusher 101 to push the unfinished gear out of the carrier and into mesh with the tool for conjoint movement therewith into the chuck following movement of the carrier back to its transfer position.

Figure 7:
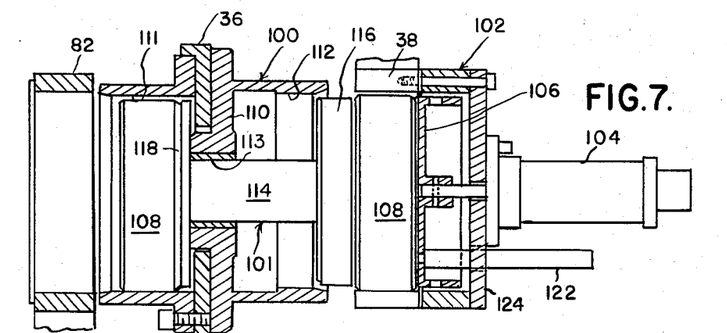
Figure 7 is a fragmentary sectional view through the transfer device in the transfer position.

In Figure 7 the carrier 100 is shown in position between the supply chute 38 and the discharge chute 82. Carried by the supply chute 38 is an injector device indicated generally at 102 which includes an air cylinder 104 having a piston therein connected to an injector plate 106 adapted to engage one of the gears 108, which at this time is an unfinished gear, carried in the supply chute in alignment with the generally cylindrical carrier 100. The carrier includes a transverse partition 110 dividing the carrier into two end chamber portions 111 and 112 respectively. The partition 110 has an opening provided with a bushing 113 receiving a rod 114 extending between a cylindrical flanged disc 116 and a bar 118 carried at the ends thereof and forming the pusher assembly 101 previously referred to. With the parts in the position shown in Figure 7 it will be appreciated that movement of the piston in the cylinder 104 to the left will move the gear 108 into the chamber 112. Movement of the gear into this position will move the pusher 101 to the left and will eject one of the gears 108, which at this time is a finished gear, into the discharge chute 82 whence it will roll downwardly away from the carrier. The injector plate 106 carries a laterally extending guide rod 122 extending through a guide opening in a plate 124 of the injector.

Figure 8:
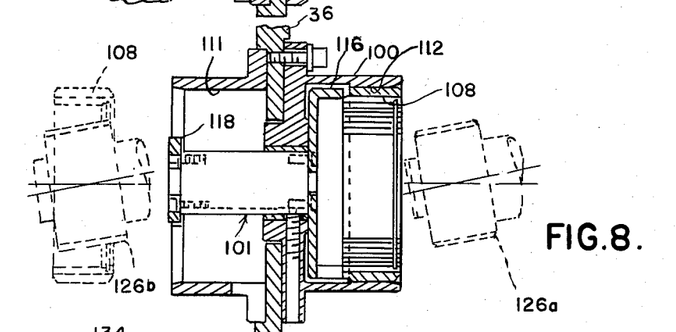
Figure 8 is a fragmentary sectional view through the transfer device in the loading position.

Referring now specifically to Figure 8, the carrier 100 is illustrated as moved to the position between the finishing tool shown in position separated from the gear support chuck in dotted lines at 126a and in the position within the chuck in dotted lines at 126b. In this figure the disc 116 is shown to the left in the position which it occupies when a work gear 108 is received in the chamber 112 of the carrier 100. Such a gear is shown in section in Figure 8. With the carrier 100 and the tool in the position shown at 126a in dotted lines, a finished work gear will now be ejected from the chuck by mechanism subsequently to be described. This movement of a finished gear 108 from the chuck into the chamber 111 results in shifting of the pusher assembly 101 to the right from the position shown in Figure 8. This in turn will result in ejecting the unfinished gear 108 from the chamber 112 to a position in which it is supported in meshed relation on the tool which occupies the position 126a.

In the operation of the machine the transfer device 36 is now moved upwardly out of position between the finishing tool and the chuck at which time the finishing tool is advanced to the left in Figure 8 in a direction parallel to the axis of the work supporting chuck, the final position of the tool being illustrated at 126b.

In Figure 8 the cutter or tool is illustrated as wider than the gear and the intended operation is plunge cutting in which feeding between the gear and tool is accomplished in a direction radial of the meshed members.

Figure 9:
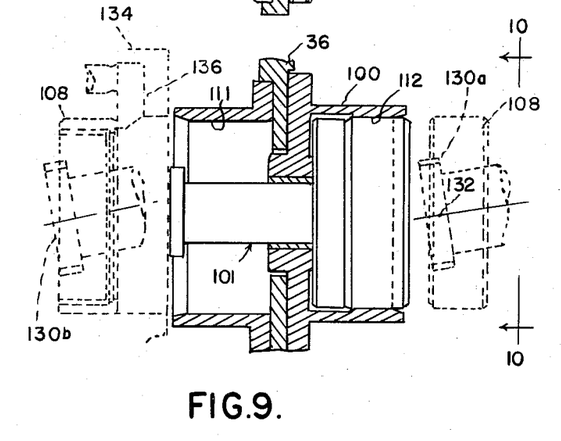
Figure 9 is a view similar to Figure 8 showing the relationship of parts for performing a different gear finishing operation.
Figure 10:
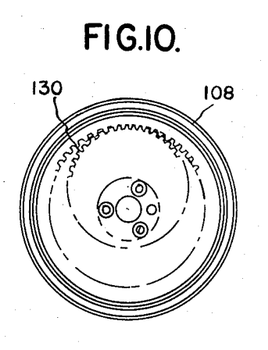
Figure 10 is a fragmentary end view of the structure shown in Figure 9 looking in the direction of the arrows 10—10, Figure 9.

A similar arrangement is illustrated in Figures 9 and 10 but in this case a cutter intended for use in a conventional shaving operation is illustrated at 130a with the gear 108 supported thereon. In this case the actual shaving operation is accomplished by rotating the gear and tool in mesh and at the same time providing relative traverse between the gear and tool in a direction parallel or substantially parallel to the axis of the gear. Depth of finishing is controlled by radial feed which takes place at the end of the traverse strokes. In this case the parts are constructed and arranged so that the gear 108 has one edge thereof, as for example the left hand edge as seen in Figure 9, located to the left of a central point 132 on the periphery of the tool. In this figure in dotted lines to the left of the carrier 100 there is illustrated the gear 108 supported on the cutter in a position indicated at 130b within the chuck. In this figure a portion of the chuck is illustrated at 134 and a clamping jaw for holding the gear 108 therein is indicated at 136.

Figures 11, 12, 13:
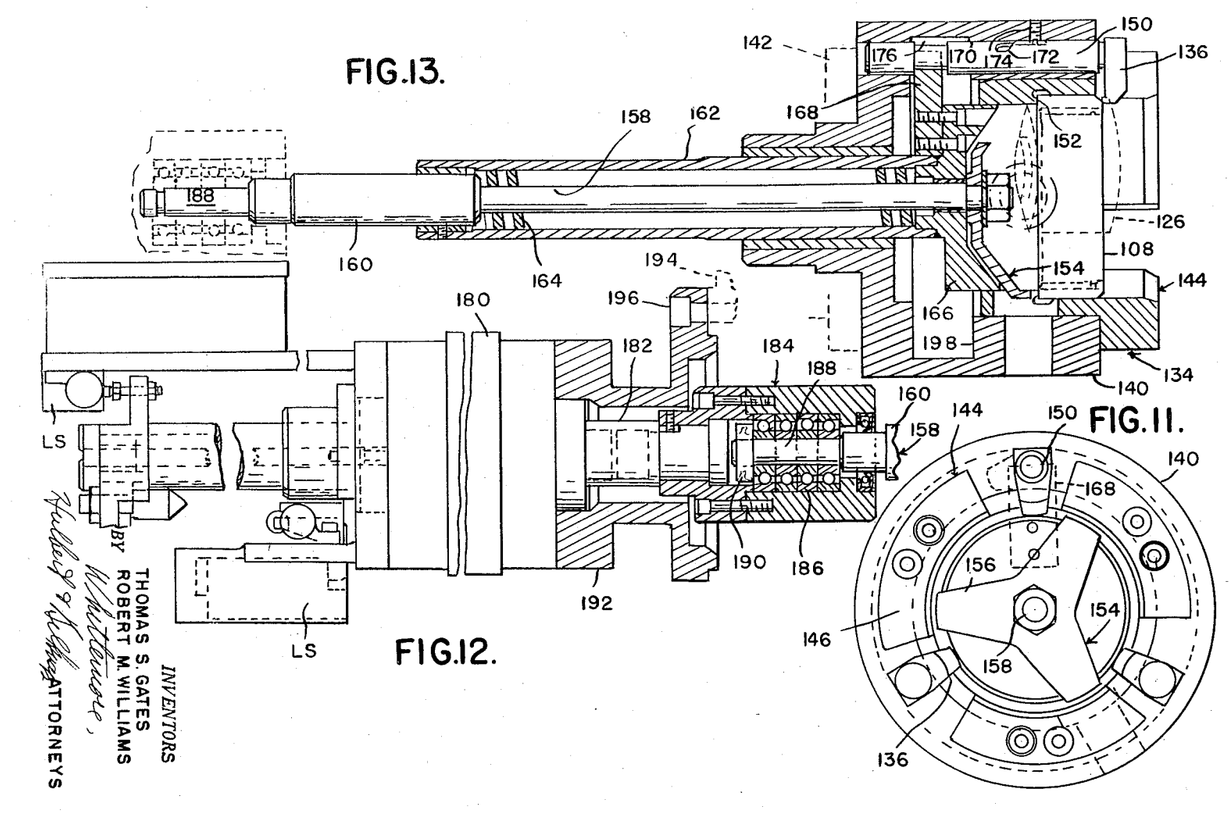
Figure 11 is an end view of the work holding chuck.
Figure 12 is a fragmentary side elevation with parts in section, of chuck actuating mechanism.
Figure 13 is a fragmentary axial sectional view through the chuck and associated mechanism.

Referring now to Figures 11-13 there is illustrated the construction of the work supporting chuck 134 and associated mechanism. The chuck comprises a head 140 fixedly mounted at the outer end of a rotable work head spindle, a portion of which is indicated in dotted lines at 142. Located within a recess in the head 140 is a slotted guide and support tube 144, the slots between circumferentially spaced forwardly extending portions 146 thereof being provided for the purpose of receiving the jaws or heads 136 of axially and circumferentially movable clamps 150. The slotted guide and support tube 144 is provided internally with a locating flange 152 against which the inner edge of the work gear 108 is received and clamped by the heads 136 of the clamps. Located inwardly of the position occupied by a gear 108 within the chuck is an ejector head 154 illustrated as provided with three forwardly and outwardly extending arms 156, best seen in Figure 11. The ejector head 154 is secured to an inwardly extending ejector bar 158 having an enlargement 160 slidably received within a clamp actuating tube 162. A relatively strong compression spring 164 is provided within the tube 162 between the enlargement 160 and a block 166 fixedly secured to the clamp actuating tube 162 and to a plurality of radially extending clamp actuating arms 168.

The clamps 150 are longitudinally slidable in cylindrical guide recesses 170 formed in the head 140. The cylindrical shanks of the clamps 150 have helically inclined grooves 172 receiving the end of a guide pin 174 so as to impart rotation to the laterally offset head 136 of the clamp as its shank is moved axially. Adjacent the rear ends of the cylindrical shanks of the clamps 150 is provided an annular recess 176 receiving the forked end of the actuating arms 168.

Referring now to Figure 12 there is illustrated a double acting air cylinder 180 having a longitudinally movable piston 182 therein. Secured to the forward end of the piston 182 is bearing structure indicated generally at 184 including ball bearings 186 engaging the reduced end 188 of the ejector bar 158. The end of the reduced portion 188 of the ejector bar 158 carries a nut or other suitable abutment element 190 so that movement of the piston within the cylinder 180 effects axial movement of the ejector bar. Free rotation of the ejector bar in connection with rotation of the chuck is provided for by the provision of the ball bearings 186.

Associated with an extension of the piston within the cylinder 180 are adjustable switch actuating abutments for actuating limit switches indicated generally at LS.

The cylinder 180 is mounted by an adapter 192 which is bolted or otherwise secured to the work head casting, a portion of which is indicated in dotted lines at 194, by fastening elements such as the screws 196.

With the foregoing construction in mind, operation of the work supporting, driving and ejecting structure will be apparent. All of the structure shown in Figure 13 in full lines is rotatable and is adapted to receive a work gear 108 and drive the same in rotation in meshed engagement with the rotary gear-like tool shown in dotted lines in this figure at 126. The cylinder 180 and associated structure is retained against rotation as is the piston and the coupling structure 184.

With the parts in the position illustrated in Figure 13, it will be observed that the work gear 108 is in mesh with the cutter 126 and is firmly supported and clamped against the locating surface 152 of the tube 144 by clamping jaws 136. When a gear finishing operation is completed the tool support is moved a substantial distance away from the work head, thereby withdrawing the tool 126 from the interior of the finished gear. At this time the transfer device 36 is moved to locate the carrier 100 in position to receive the finished gear 108 when it is ejected from the work support. At this time air is admitted to the cylinder 180 and moves the piston and piston rod 182 to the right thereby moving the ejector bar 158 and the clamping tube 162 to the right in unison. This movement continues for a short distance as for example approximately one-eighth of an inch, until the arms 156 of the ejector head 154 engage the inner edge of the finished gear 108. The initial movement of the clamping tube 162 will have moved the clamping elements 150 slightly to the right to release the finished gear 108. Further movement of the ejector bar 158 results in corresponding movement of the clamping tube. This in turn causes the clamping heads 136 of the clamps to move just ahead of the finished gear 108 and simultaneously to be rotated into a clearance position. After the clamping heads 136 have been rotated to clearance position, the arms 168 of the clamping structure engage the inner surface 198 of the head 140, thus terminating further movement of the clamping tube. Thereafter, the ejector bar 158 continues its movement for example, for a distance sufficient to complete a 4⅛ inch stroke. This movement moves the gear out of the work supporting chuck and into the recess in the carrier 100. This movement also compresses the spring 164 so that when air pressure is released in the cylinder 180, the ejector bar 158 and the head 154 return to a position within the tube 144 leaving the clamping heads 136 located in clearance position to provide for receiving the next gear to be finished. When the next gear is then moved into the tube 144, air is admitted in the opposite direction to the cylinder 180 and the heads 136 are rotated and simultaneously drawn inwardly of the tube 144 to move the work gear 108 against the locating surface 152 and to clamp the gear in such position.

Figures 14, 15, 16:
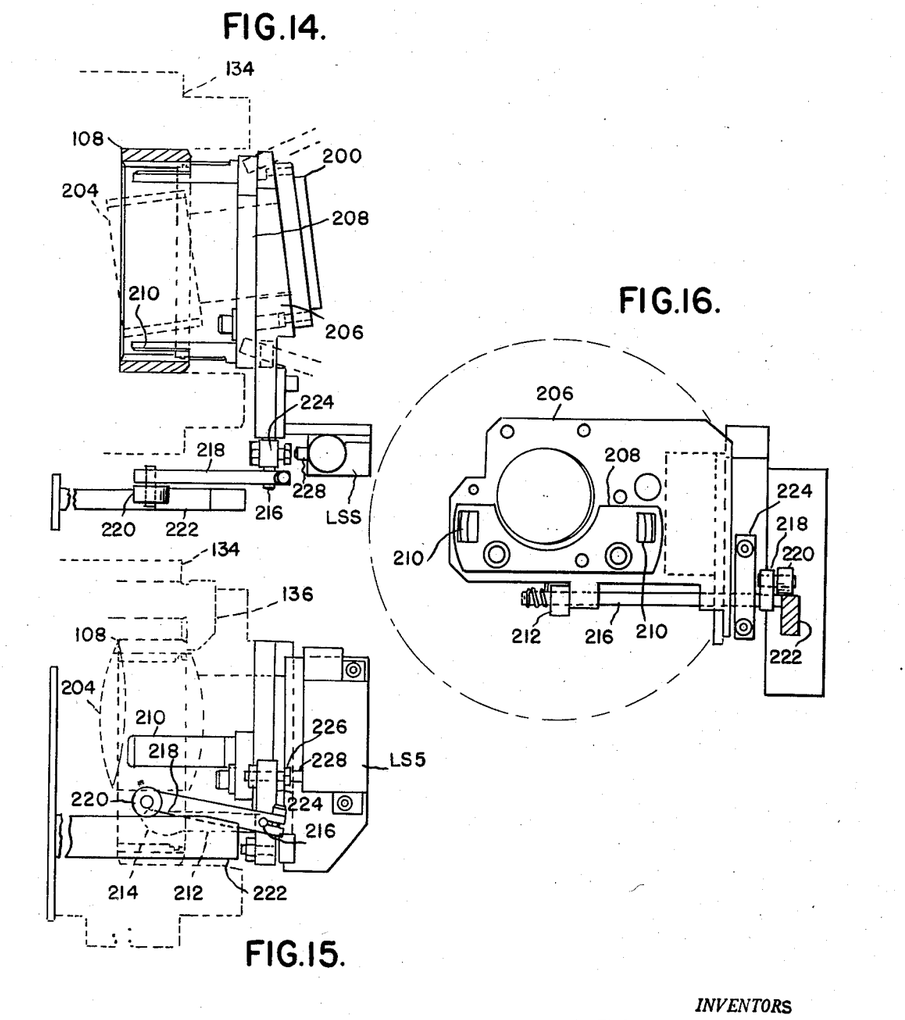
Figure 14 is a fragmentary plan view showing the relative positions of the work support and cutter support during the machining operation.
Figure 15 is a fragmentary side elevation of the cutter support with a portion of the work support shown in section.
Figure 16 is an end view of the structure shown in Figure 14.

Referring now to Figures 14–16 there are illustrated some details of the tool support. In these figures a retainer plate 200 adapted to be fixedly mounted at the forward end of the cutter supporting quill 202 (Figure 2) is provided. In Figure 2 the cutter supporting structure is shown for simplicity with its axis parallel to the axis of the work supporting structure, but it will of course be appreciated that in use the cutter support is set around at the appropriate crossed axes angle.

In Figures 14 and 15 the rotary gear-like finishing tool is indicated at 204 and the gear to be finished thereby is indicated at 108. Inasmuch as it is a requirement that the gear 108 shall move axially in properly guided relation into the open end of the pot chuck 134 it is essential to provide support means for the gear in addition to the tool. These support means are carried by an adapter plate 206 which is bevelled to provide for the particular angular setting of the tool 204.

In order to provide support for the gear 108 and to prevent it swinging or moving as it is advanced into the chuck, the tool support includes a fixture 208 attached to the adapter 206 having locating fingers 210. The inner surfaces of the fingers 210 are adapted to enter the interior of the gear and to prevent substantial movement thereof but they are designed to be in clearance with respect thereto when the gear is finally clamped in the chuck. This is because the locating fingers 210 remain within the internal gear during the shaving operation.

Means are provided to prevent automatic cycling of the machine in the event that movement of the gear 108 onto the tool 204 does not result in proper meshing engagement between the gear and tool. This means comprises an arm 212 having a rounded head portion 214 adapted to enter into the internal gear as the gear is advanced out of the carrier 100 onto the tool 204. The rounded head portion 214 of the arm 212 is located at the underside of the gear. If the gear fails to mesh with the tool 204 it will be supported in an elevated position. The arm 212 is rigidly connected to a shaft 216 having a second arm 218 fixed thereto. The arm 218 at its outer end has a roller 220 adapted to engage a cam bar 222 as the tool support is moved forwardly to position the gear within the chuck. The forward end of the cam bar 222 is inclined as best illustrated in Figure 15.

Also fixed to the shaft 216 is an arm 224 having an adjustable abutment 226 adapted to engage the actuating element 228 of a limit switch LS5.

If the gear 108 fails to mesh with the tool 204 as it is moved into supported position thereon, it is retained in an elevated position which rocks the arm 212 clockwise as seen in Figure 15 to a position such that the abutment 226 on the arm 224 actuates the limit switch LS5 and thus prevents further automatic cycling of the machine until the gear and tool are brought into mesh. When the gear 108 is advanced into the chuck, the arm 218 is rocked upwardly by the inclined surface of the cam bar 222, thus moving the rounded end 214 of the arm 212 out of contact with the inner surface of the gear to prevent its rotation without interference during the finishing operation.

It will of course be appreciated that the sequences of operations is automatically controlled by appropriate limit switches, some of which have been designated.

The overall operation will be reviewed for completeness. In describing this operation it is assumed that a gear finishing operation has just been completed and as an incident thereof, the tool support has been retracted a substantial distance away from the work support, leaving the finished gear clamped in the work supporting chuck. At this time the transfer device is in its transfer position with the carrier 100 located between aligned end portions of the supply and discharge chutes 38 and 82 respectively. Furthermore, the injector 102 has been operated to move an unfinished gear into the chamber 112 of the carrier 100 and simultaneously to eject a finished gear into the discharge chute 82. At this time the transfer device 36 moves downwardly to position the carrier 100 intermediate the gear finishing tool 126 and the open end of the chuck 134.

At this time air is admitted to the cylinder 180 thus unclamping the gear in the chuck and moving it out of the open end of the chuck into the chamber 111 at the adjacent end of the carrier 100. This in turn shifts the pusher assembly 101 causing it to move the unfinished gear onto the tool 126 where it is supported in meshed relation. In the event that the gear fails to mesh with the teeth of the tool as it is moved thereon, arm 212 is raised and limit switch LS5 is actuated to prevent further automatic cycling of the machine. However, in normal operation the gear will mesh with the tool and thereafter the transfer device is raised to its transfer position in which the carrier is again positioned between aligned end portions of the supply chute 38 and the discharge chute 82. As soon as the carrier 100 has cleared the chuck, the tool slide moves forwardly to position the tool with the gear supported thereon within the pot chuck. Air is admitted to the cylinder 180 causing the clamping heads to be rotated into position and moved into engagement with the outer side of the gear, to clamp the gear against the locating surface 152 within the chuck. At this time automatic cycling of the gear shaving machine is initiated and may involve relative traverse between the gear and tool in addition to meshed rotation, or it may involve simple radial feed in addition to meshed rotation in the event that the finishing operation is a plunge finishing operation.

During the gear finishing operation which occupies a substantial interval, the transfer device completes its movement into transfer position at which time the injector 102 is operated from the position illustrated in Figure 7 to push a gear 108 from the supply chute 38 into the chamber 112 and thereby to push the pusher assembly 101 to the left as seen in Figure 7. This results in displacement of the gear 108, which is a finished gear, from the chamber 111 into the discharge chute 82.

Upon completion of the shaving operation the tool slide moves a substantial distance away from the work supporting chuck, withdrawing the gear finishing tool from its meshed engagement with the gear, and locating it in spaced relation so as to permit downward movement of the transfer device to again position the carrier 100 between the chuck and the tool.

This operation may be continued with fully automatic cycling without attention and requires only that a supply of unfinished gears be maintained in the supply chute 38 and the finished gears removed from the discharge chute 82.

While some of the limit switches employed in the automatic cycling of the machine have been illustrated, no effort has been made to show all of the limit switches which sense the condition of various parts of the machine since automatic controls of this type involve well known components and the bringing together of these automatic control devices is not an integral part of the present invention.

The meshing of the gear and tool is accomplished by moving the gear over the tool in a position above its fully meshed position. If the gear is helical, its axial movement relative to the tool, as it rests on the tool, insures meshing. In the unlikely event that the tops of the teeth of the gear ride over the tops of the teeth of the tool, so that the gear does not drop down into mesh, automatic cycling is terminated. Meshing may be effected in this case by causing slight rotation or jogging the tool.

The drawings and the foregoing specification constitute a description of the improved gear finishing in such full, clear, concise and exact terms as to enable any person skilled in the art to practice the invention, the scope of which is indicated by the appended claims.

What we claim as our invention is:

1. An automated gear finishing machine comprising a chuck for receiving an internal gear, a tool support for a gear-like finishing tool movable between a position in which a tool thereon is in finishing relation within a gear in said chuck and a position spaced from the open end of the chuck, a transfer device movable between a loading position intermediate said chuck and said tool support and a receiving and discharge position, said transfer device having unfinished gear support means for receiving an unfinished gear at the side thereof adjacent said tool support and having finished gear support means for receiving a finished gear at the side thereof adjacent said chuck, means associated with said support means to provide for ejection of a gear from either of said support means upon advance of a gear into the other of said support means, means for ejecting a finished gear from said chuck into said finished gear support means to thereby eject an unfinished gear from said unfinished gear support means into meshed relation on a tool on said tool support while said device is between said chuck and tool support, movement of an unfinished gear into the unfinished gear support means of said device, while said device is in receiving and discharge position being operable to eject a finshed gear from said device.

2. An automated gear finishing machine comprising a chuck for receiving an internal gear, a tool support for a gear-like finishing tool movable between a position in which a tool thereon is in finishing relation within a gear in said chuck and a position spaced from the open end of the chuck, a transfer device movable between a loading position intermediate said chuck and said tool support and a receiving and discharge position, said transfer device having unfinished gear support means for receiving an unfinished gear at the side thereof adjacent said tool support and having finished gear support means for receiving a finished gear at the side thereof adjacent said chuck, means associated with said support means to provide for ejection of a gear from either of said support means upon advance of a gear into the other of said support means, means for ejecting a finished gear from said chuck into said finished gear support means to thereby eject an unfinished gear from said unfinished gear support means into meshed relation on a tool on said tool support while said device is between said chuck and tool support, and means operable while said device is in receiving and discharge position to advance an unfinished gear into said unfinished gear support means to thereby eject the finished gear therefrom.

3. A machine as defined in claim 2 in which said transfer device comprises a pivoted arm, and means operable to shift said arm between its said positions.

4. A machine as defined in claim 2 comprising laterally spaced supply and discharge chutes positioned to receive the gear support means of said transfer device therebetween when said device is in its receiving and discharge position.

5. A machine as defined in claim 4 in which the means to advance the unfinished gear onto the unfinished gear support means of said device comprises a pusher carried by said supply chute.

6. A machine for finishing internal gears comprising a rotary chuck for receiving internal gears, a rotary tool support for a gear-like rotary tool movable between a working position in which a tool thereon is in meshed relation with a gear received in said chuck and a loading position spaced from said chuck, a transfer device movable between a loading position between said chuck and tool support and a transfer position, said device having means for receiving gears from opposite sides thereof and constructed to provide for displacement of a gear carried thereby by movement of a second gear thereon, and means associated with said chuck operable to eject a finished gear therefrom onto said device to displace an unfinished gear on said device onto a tool carried by said tool support for subsequent movement therewith into said chuck.

7. A machine for finishing internal gears comprising a rotary chuck for receiving internal gears, a rotary tool support for a gear-like rotary tool movable between a working position in which a tool thereon is in meshed relation with a gear received in said chuck and a loading position spaced from said chuck, a transfer device movable between a loading position between said chuck and tool support and a transfer position, said device having means for receiving gears from opposite sides thereof and constructed to provide for displacement of a gear positioned thereon from one side by movement of a second gear thereon from the other side thereof, and means associated with said chuck operable to eject a finished gear therefrom onto said device to displace an unfinished gear on said device onto a tool carried by said tool support for subsequent movement therewith into said chuck.

8. A machine for finishing internal gears comprising a rotary chuck for receiving internal gears, a rotary tool support for a gear-like rotary tool movable between a working position in which a tool thereon is in meshed relation with a gear received in said chuck and a loading position spaced from said chuck, a transfer device movable between a loading position between said chuck and tool support and a transfer position, said device having open gear receiving receptacles at opposite sides thereof, means on said device movable between said receptacles and operable to displace a gear carried in one of said receptacles upon movement of a second gear into the other receptacle, and means associated with said chuck operable to eject a finished gear therefrom onto said device to displace an unfinished gear on said device onto a tool carried by said tool support for subsequent movement therewith into said chuck.

9. A gear finishing machine comprising a rotary work support for an internal gear and a rotary tool support for a gear-like finishing tool, work clamping means on said work support, work ejecting means on said work support, means for driving one of said supports in rotation, means for effecting relative approach and separation between said supports in a direction generally parallel to the axis of said work support, a transfer device having separate finished and unfinished gear support portions movable into and out of loading position intermediate said supports while said supports are separated and adapted to carry an unfinished gear into loading position, means on said transfer device operable to cause reception of the finished gear from said work clamping means to displace the unfinished gear therefrom onto a tool on said tool support, and means for moving said device out of loading position to provide for subsequent relative approach movement between said supports.

10. A gear finishing machine comprising a rotary work support for an internal gear and a rotary tool support for a gear-like finishing tool, work clamping means on said work support, work ejecting means on said work support, means for driving one of said supports in rotation, means for effecting relative approach and separation between said supports in a direction generally parallel to the axis of said work support, a transfer device having gear receiving receptacles at opposite sides thereof and comprising means to provide for displacement of a gear carried thereby by movement of a second gear thereon, said receptacles being adapted to carry an unfinished gear into loading position, to receive a finished gear ejected from said work support, and to cause reception of the finished gear to displace the unfinished gear therefrom onto a tool on said tool support, and means for moving said device out of loading position to provide for subsequent relative approach movement between said supports.

11. A gear finishing machine comprising a rotary work support for an internal gear and a rotary tool support for a gear-like finishing tool, work clamping means on said work support, work ejecting means on said work support, means for driving one of said supports in rotation, mean for effecting relative approach and separation between said supports in a direction generally parallel to the axis of said work support, a transfer device having gear receiving receptacles at opposite sides thereof and comprising pusher means movable intermediate said receptacles to be moved by movement of a gear into either receptacle to displace a gear from the other receptacle, said receptacles being adapted to carry an unfinished gear into loading position, to receive a finished gear ejected from said work support, and to cause reception of the finished gear to displace the unfinished gear therefrom onto a tool on said tool support, and means for moving said device out of loading position to provide for subsequent relative approach movement between said supports.

12. A gear finishing machine comprising a rotary work support for an internal gear and a rotary tool support for a gear-like finishing tool, work clamping means on said work support, work ejecting means on said work support, means for driving one of said supports in rotation, means for effecting relative approach and separation between said supports in a direction generally parallel to the axis of said work support, a transfer device having a gear support portion movable between a loading position intermediate said supports while said supports are separated and a transfer position, and adapted to carry an unfinished gear into position adjacent a tool on said tool support and to receive a finished gear ejected from said work support, and means on said transfer device to cause reception of the finished gear to displace the unfinished gear therefrom onto a tool on said tool support, means for moving said device from loading to transfer position to provide for subsequent relative approach movement between said supports, supply and discharge chutes at said transfer position, and means at said supply chute operable to push an unfinished gear onto said device and thereby to push the previously finished gear onto said discharge chute.

References Cited in the file of this patent

UNITED STATES PATENTS

| | | |
|---|---|---|
| 1,737,208 | Tessky | Nov. 26, 1929 |
| 1,835,591 | Bullard | Dec. 8, 1931 |
| 1,933,226 | Smith et al. | Oct. 31, 1933 |
| 2,191,930 | Arms et al. | Feb. 27, 1940 |
| 2,639,491 | Rose et al. | May 26, 1953 |